(12) United States Patent
Narayanaswami (10) Patent No.: US 6,654,414 B1
(45) Date of Patent: *Nov. 25, 2003

(54) VIDEO CONFERENCING USING CAMERA ENVIRONMENT PANORAMAS

(75) Inventor: Chandrasekhar Narayanaswami, Valhalla, NY (US)

(73) Assignee: IBM Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1012 days.

(21) Appl. No.: 08/745,524

(22) Filed: Nov. 12, 1996

(51) Int. Cl.$^7$ ............................. H04N 7/12; H04N 7/18
(52) U.S. Cl. .................................................. 375/240.01
(58) Field of Search ................................ 345/427, 326, 345/425, 437; 348/14–15, 17–19, 384, 390, 402, 407, 409–413, 415, 416, 699, 36, 61; 382/232, 236, 238; 375/240, 240.01; H04N 7/12, 7/18

(56) References Cited

U.S. PATENT DOCUMENTS

| | | | | |
|---|---|---|---|---|
| 4,926,259 A | * | 5/1990 | Billard et al. | 348/61 |
| 4,951,140 A | * | 8/1990 | Ueno et al. | 348/413 |
| 5,202,759 A | * | 4/1993 | Laycock | 348/14 |
| 5,236,199 A | * | 8/1993 | Thompson, Jr. | 348/14 |
| 5,347,305 A | * | 9/1994 | Bush et al. | 348/14 |
| 5,384,588 A | | 1/1995 | Martin et al. | |
| 5,396,583 A | * | 3/1995 | Chen et al. | 345/427 |
| 5,418,560 A | * | 5/1995 | Yasuda | 348/14 |
| 5,446,833 A | * | 8/1995 | Miller et al. | 345/425 |
| 5,541,639 A | * | 7/1996 | Takatsuki et al. | 348/14 |
| 5,541,982 A | * | 7/1996 | Bergler | 348/14 |
| 5,561,756 A | * | 10/1996 | Miller et al. | 345/326 |
| 5,657,246 A | * | 8/1997 | Hogan et al. | 348/14 |
| 5,673,079 A | * | 9/1997 | Satoh | 348/14 |
| 5,710,590 A | * | 1/1998 | Ichige et al. | 348/14 |
| 5,742,289 A | * | 4/1998 | Naylor et al. | 348/402 |

* cited by examiner

Primary Examiner—Richard Lee (57) ABSTRACT

Image data is communicated from a source system to a target system. At the source system, a background environment map is generated and communicated to the target system. The source system then captures a source image from position and field of view of a camera. In addition, the background environment map is rendered according to the position and field of view of the camera to generate a background image visible for the position and field of view of the camera. A difference image is generated representing difference between the source image and the background image. Finally, the difference image and the position and field of view of the camera is communicated to the target system. At the target system, the background environment map is received from the source system. In addition, the difference image and the position and field of view of the camera is received from the source system. The background environment map is rendered according to the position and field of view of the camera to thereby generate a background image visible for the position and field of view of the camera. Finally, a target image based upon the background image and difference image is generated for display.

21 Claims, 8 Drawing Sheets

VIDEO CONFERENCING USING CAMERA ENVIRONMENT PANORAMAS

CROSS REFERENCE TO RELATED APPLICATIONS

The present application is related to U.S. patent application Ser. No. 60/023,143, and U.S. patent application Ser. No. 60/022,428, both filed on Aug. 5, 1996 and assigned to the common assignee of the present invention, herein incorporated by reference in their entirety.

BACKGROUND OF THE INVENTION

1. Technical Field

The invention relates generally to video conferencing systems, and more particularly to video conferencing systems that allow the use of precomputed panoramic three dimensional images from viewpoint of the cameras at all stations involved in the video conference.

2. Description of the Related Art

Video conferencing is becoming a popular medium of communications as is evidenced by the use of products from PictureTel, Compression Labs, and several PC software techniques such as Intel ProShare, etc. A video conferencing system includes two or more stations that are connected to one another by a communication link. Each station participating in the video conference shares one or more real time video feeds with each of the other stations. A video feed normally includes both pictures and sounds. Each participating station includes a camera that can be controlled locally with a control pad at the base and by any other participating station. The camera transmits images and audio at the best frame rate that is possible using the communication link. Typically some form of data compression is used to reduce the data to be transmitted to send the videos and sound. In some systems separate communication links are used for the audio and video to increase available bandwidth. The camera can be rotated to look up or down (elevation) and left or right (azimuth), and can zoom in to or out of a particular region. The base control pad can communicate to the local camera system either by wired or wireless communication.

The drawbacks of video conferencing as available today are jerky images and the small resolution of the video conference window. These drawbacks occur due to limited bandwidth of both POTS (Plain Old Telephone System) and ISDN phone lines and due to limited computer processing power that prohibits the use of more sophisticated compression and decompression schemes that would reduce the required bandwidth.

As a result of the above drawbacks video conferencing is less effective than it can be as a collaborative communication medium.

Existing video conferencing techniques use proprietary compression algorithms (such as Indeo, H.320) or public domain compression methods (such as CU-SeeMe and Network Video).

Indeo starts with YUV (Chrominance-Luminance) input images in which U and V subsampled 4:1 both horizontally and vertically. Indeo supports motion estimation, and uses the previous frame to predict values for the current frame and only transmits data if the difference is significant. Transform encoding is done using an 8×8 Fast Slant Transform (FST) in which all operations are all shifts or adds. Quantization and run-length/entropy encoding are used for coefficients.

CU-SeeMe from Cornell University uses both intra-frame and inter-frame compression. It represents video input in 16 shades of grey using 4 bits per pixel. The image is divided into 8×8 blocks of pixels for analysis. New frames are compared to previous frames, and if a block has changed significantly it is retransmitted. Blocks are retransmitted on a periodic basis to account for losses that my have occurred in the network. Transmitted data is compressed by a lossly algorithm that exploits spatial redundancy in the vertical direction.

Network Video is an Internet video conferencing tool developed at Xerox/PARC and uses both intra-frame and inter-frame compression. The current frame is compared to the previous frame and areas that have changed significantly are compressed using transform coding. Either a Discrete Cosine Transform (DCT) or a Haar wavelet transform is used. The Network Video encoder dynamically uses DCT techniques if network bandwidth is the bottleneck and Haar transform techniques if local computation is the bottleneck. The output of the transform is then quantized and run-length encoded. Higher resolution images of unchanged parts are sent periodically.

Other techniques such as MJPEG, H.261 (px64), such as CellB are similar to above, and may also be used.

One of the drawbacks of the existing systems is that as the camera at the transmitting end moves to focus on a different speaker a whole new part of the room comes into the picture thus introduces large amounts of new data in the image to be sent. A similar situation arises when the camera zooms in on a particular speaker. New areas of images come into the picture that cannot exploit temporal (inter-frame) compression. A careful look at the new image shows that the area around the speaker and behind the speaker may have changed very minimally in the conference room. Though there is little change, the inter-frame compression technique is not able to exploit the situation. As a result, motion is very jerky and so users prefer to not change focus between speakers at a fine granularity. This encourages the users to keep the camera fixed and limits the realism of video conferencing. In a real conference room all eyes move to look at the speaker and do not stay stationary. Thus we feel that for a more realistic video conference the camera must be able to move rapidly without degrading the quality of the image being shown.

SUMMARY OF THE INVENTION

The above-stated problems and related problems of the prior art are solved with the principles of the present invention, video conferencing using camera environment panoramas. Image data is communicated from a source system to a target system. At the source system, a background environment map is generated and communicated to the target system. The source system then captures a source image from a position and field of view of a camera. In addition, the background environment map is rendered according to said position and field of view of said camera to generate a background image visible for said position and field of view of said camera. A difference image is generated representing difference between the source image and the background image. Finally, the difference image and said position and field of view of the camera is communicated to the target system. At the target system, the background environment map is received from said source system. In addition, the difference image and the position and field of view of the camera is received from the source system. The background environment map is rendered according to the position and field of view of the camera to thereby generate a background image visible for the position and field of view of the camera. Finally, a target image based upon the background image and the difference image is generated for display.

DETAILED DESCRIPTION OF THE PREFERRED EMBODIMENTS

A method and apparatus for conducting video conferencing is disclosed herein. The invention below is described with respect to a uni-directional point-to-point video conferencing session between a source video system and a target video system. However, the invention is not limited in this respect and may be applied to bi-directional point-to-point video conferencing sessions and uni-directional and bi-directional multicast video conferencing sessions.

Figure 1:
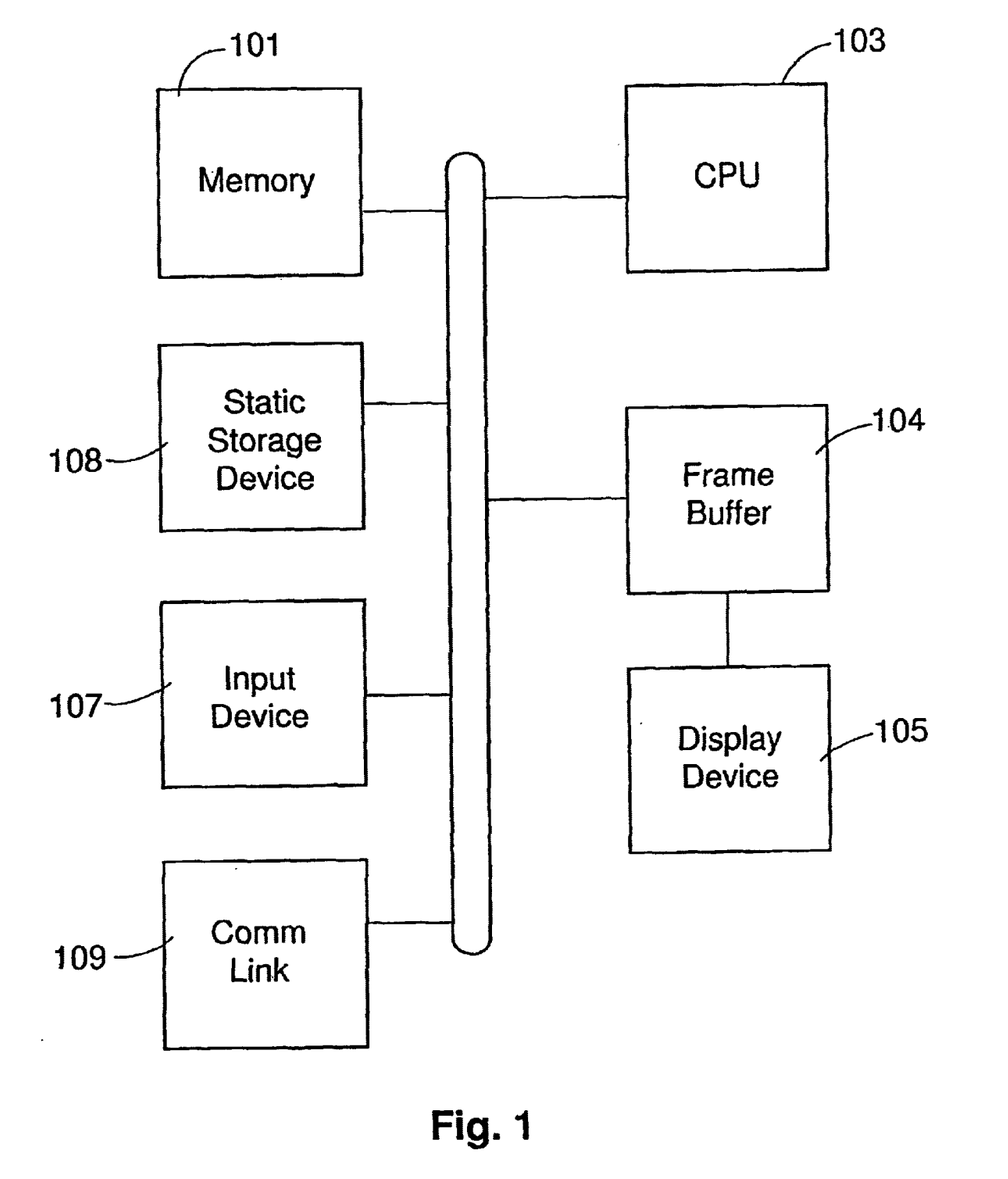
FIG. 1 is a functional block diagram of a computer processing system that may be utilized by the preferred embodiment of the present invention.

The source video system and target video system of the present invention may be implemented on any computer processing system including, for example, a stand alone video conferencing machine, a personal computer, a workstation, or a graphics adapter that works in conjunction with a personal computer or workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition the computer processing system includes a camera whose elevation, azimuth and zoom parameters can be controlled via the computer or via a separate control pad. The camera is capable of converting its image into pixels that may be stored in the memory included in the computer system.

In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the non-volatile storage device 108 and/or memory 101.

Furthermore, the computer processing system includes a frame buffer 104 coupled between the CPU 103 and a display device 105 such as a CRT display or LCD display. The frame buffer 104 contains pixel data for driving the display device 105. In some systems, a rendering device (not shown), also known as a graphics accelerator, may be coupled between the CPU 103 and the frame buffer 104.

In addition, the computer processing system includes a communication link 109 (such as a network adapter, RF link, or modem) coupled to the CPU 103 that allows the CPU 103 to communicate with other computer processing systems over the communication link, for example over a POTS line, over an ISDN link, or over the Internet. The CPU 103 may receive portions of the operating system, portions of the application program(s), or portions of the data used by the CPU 103 in executing the operating system and application program(s).

It should be noted that the application program(s) executed by the CPU 103 may perform the video conferencing methods of the present invention described below. Alternatively, portions or all of the video conferencing methods described below may be embodied in hardware that works in conjunction with the application program executed by the CPU 103.

The video conferencing techniques of the present invention conceptually may be divided into three phases:

1) Calibration Phase;
2) Start-Up Phase;
3) Conference Phase.

Calibration Phase

Figure 6A:
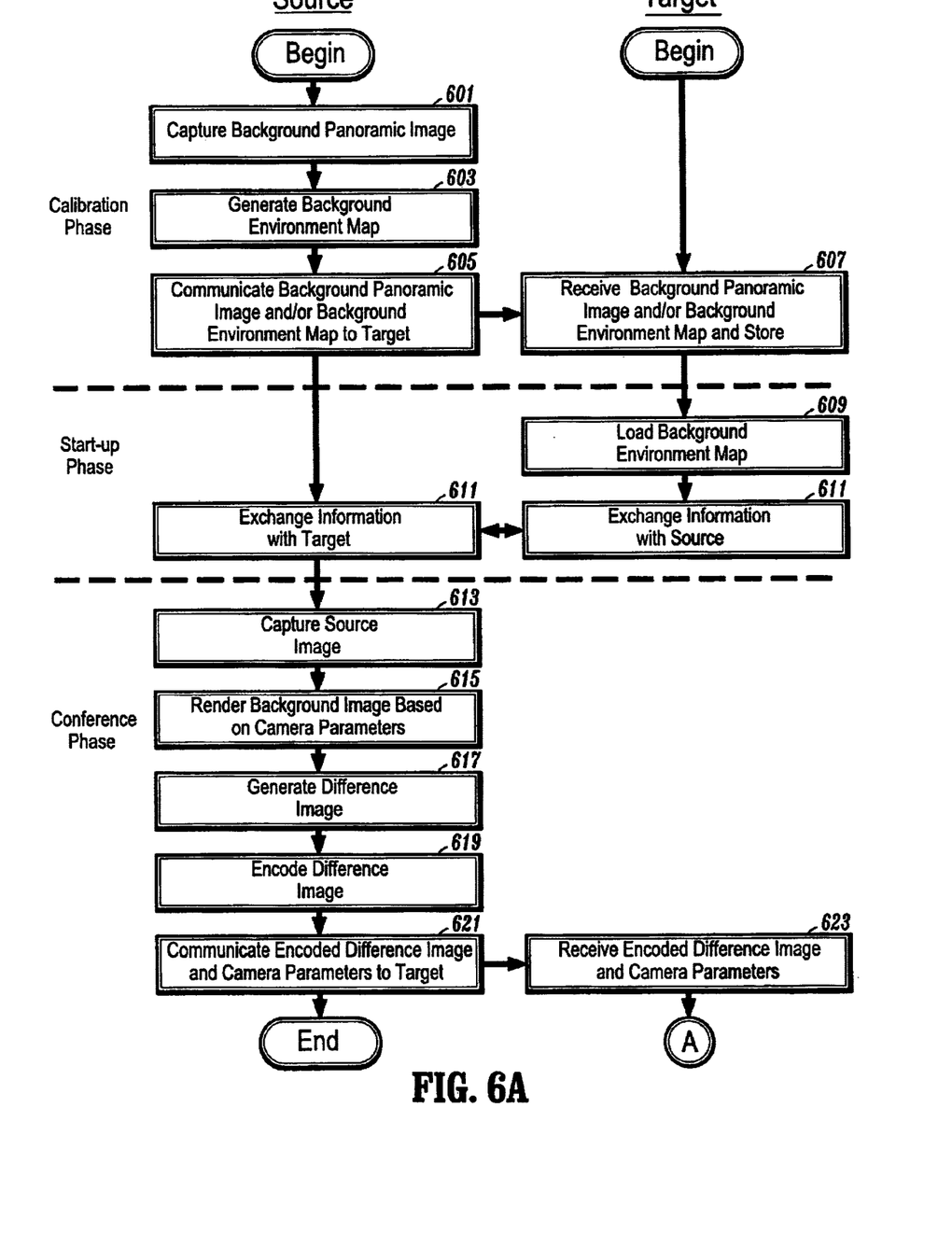
FIGS. 6(A) and (B) is a flow chart illustrating the method for conducting video conferencing according to the present invention.
Figure 6B:
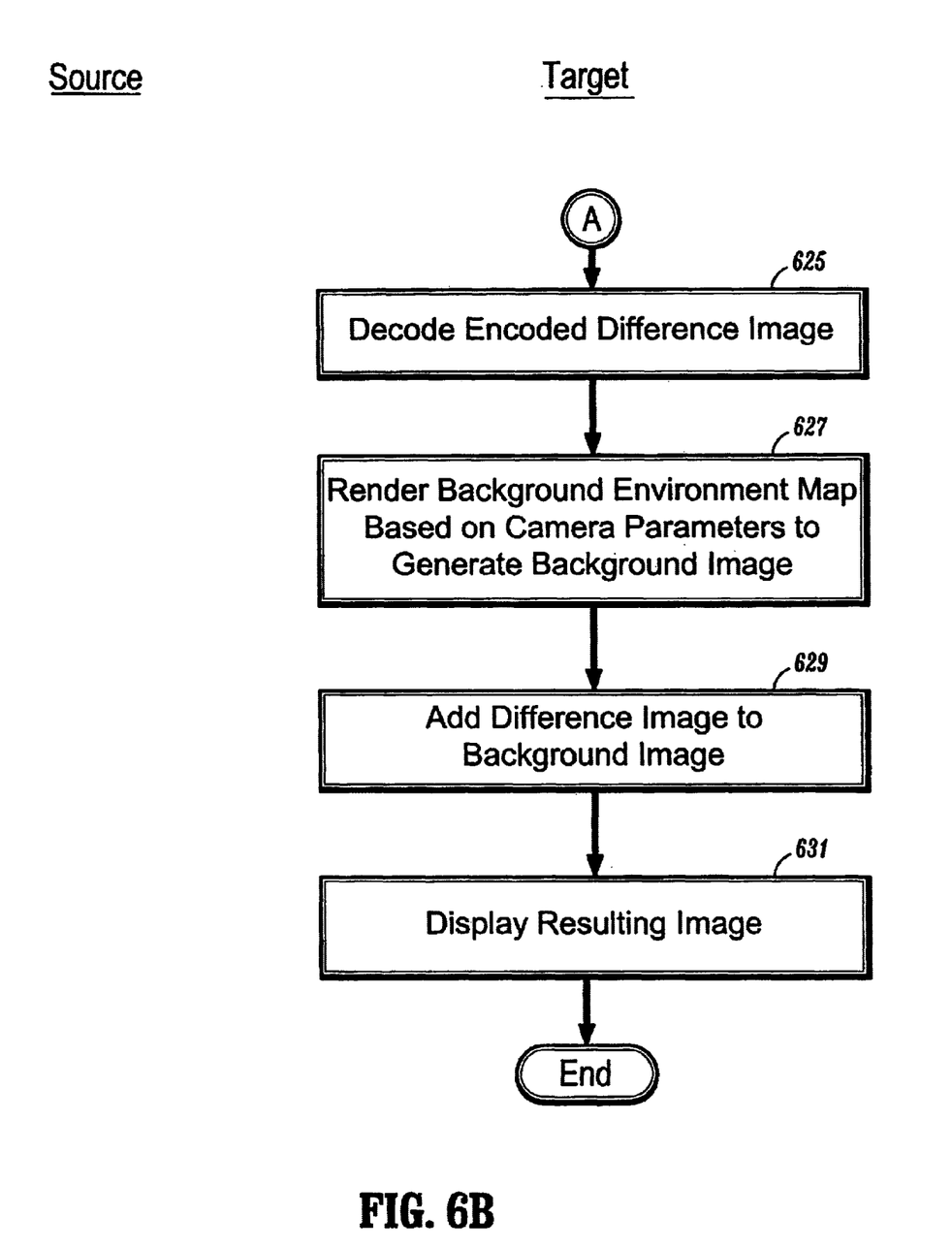

As illustrated in FIGS. 6(A) and (B), in the calibration phase, the source video system captures a background panoramic image (PRX) from the viewpoint of the camera in the room from which the video conference is being transmitted (step 601). The PRX image may be a partial panorama (less than 360 degrees) or a full panorama (360 degrees). The source video system then generates an environment map that represents the background panorama PRX (step 603). The environment map provides the capability of rendering an image as seen for different orientations and fields of view of the source video camera. The source video system communicates the background panoramic image PRX and/or the background environment map to the target video system (step 605), where it is received and stored by the target video system (step 607).

Existing software solutions may be used to capture the background panoramic image PRX and generate the corresponding background environment map. One such solution is the software developed and sold by Apple Computer, Inc. of Cupertino, Calif. under the name QuicktimeVR. The QuicktimeVR software is segmented into two distinct packages. The first package, which is sold to content providers, is an authoring tool that allows content providers to develop a panoramic three-dimensional image from multiple views of a scene. The second package is a viewer which is distributed to consumers and which allows the consumer to view the panoramic three-dimensional images created by the authoring tool. A more detailed description of the operation of the QuicktimeVR system may be found in Chen, "QuicktimeU VR—An Image-based Approach to Virtual Environment Navigation", SIGGRAPH 1995, Los Angeles, Calif., pp. 29–38, and in U.S. Pat. No. 5,396,583 to Chen et al., which is assigned to Apple Computer, Inc.

The QuicktimeVR system utilizes a cylindrical environment map to represent the panoramic view of a scene (or collection of images). Different perspective views are rendered by mapping the cylindrical environment map to a desired viewing window.

What will now be described is an environment panorama. The environment map described below is a cylindrical environment map; however, the present invention is not limited in this respect and may be applied to any environment map, for example, a spherical environment map or polyhedral environment map as set forth in U.S. patent application Ser. No. 60/022,428, incorporated by reference above in its entirety.

A cylindrical environment map is composed of a rectangular array of elements or pixels wherein each pixel includes data representative of the portion of a three dimensional scene contained within the narrow pyramid defined by the origin of the axis of a cylinder and a rectangular area on the surface of the cylinder.

Figure 2A:
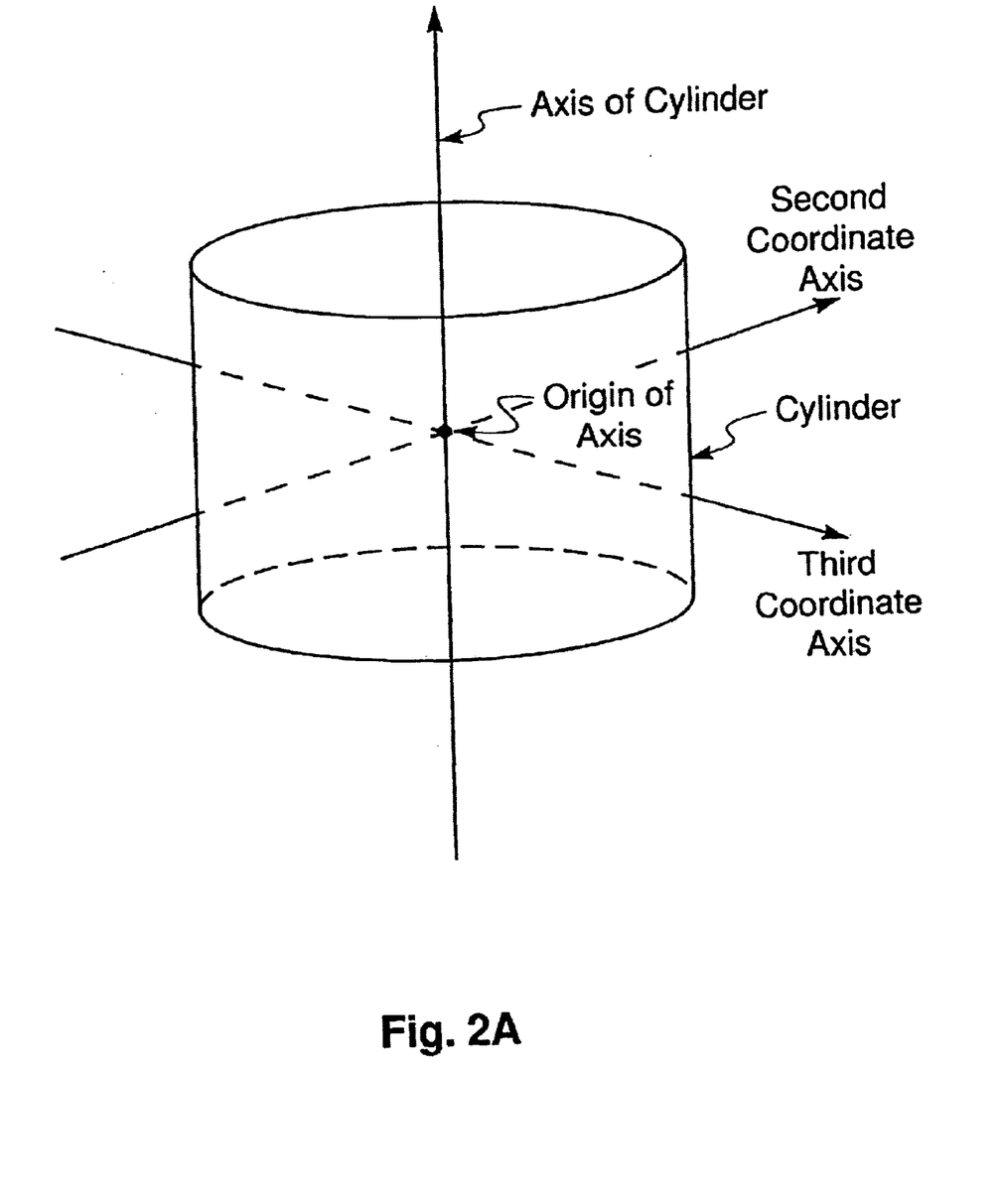
FIGS. 2(A) and (B) illustrate a cylindrical environment map.
Figure 2B:
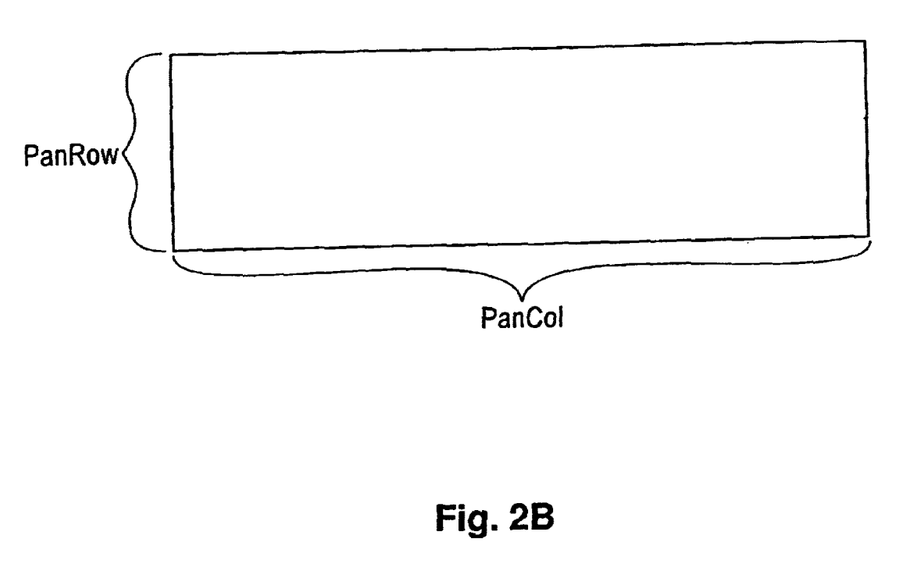

Each pixel of the cylindrical environment map may be characterized by a column index and row index, where the column index corresponds to an azimuth angle relative to the axis of the cylinder and the origin of the cylinder and the row index corresponds to an elevation angle relative to the axis of the cylinder and the origin of the cylinder. FIG. 2(A) illustrates a cylindrical environment map, and FIG. 2(B) illustrates an unrolled cylindrical environment map where the horizontal axis corresponds to the column index/azimuth angle of the pixels and the vertical axis corresponds to row index/elevational angle of the pixels. The cylindrical environment map has panRow rows and panCol columns as shown. A complete panorama includes color values for azimuth angles in the range of 0 to $2\pi$, wherein a partial panorama includes color values for azimuth angles in a subset of this range. A more detailed description of the cylindrical environment map may be found in U.S. patent application Ser. No. 60/023,143, incorporated by reference above in its entirety.

The image data of the cylindrical environment map is preferably stored in column order. It is a common practice to store the image data in row order. That is, the data representative of an image having nCol columns and nRow rows is typically stored as a sequence of nRow contiguous blocks of data each containing the data for nCol contiguous pixels representing a horizontal band across the image, the data for successive rows being stored in sequence from top to bottom or from bottom to top. In this case, the number of rows is a measure of the height of the image and the number of columns is a measure of the width of the image. A panoramic image based on a cylindrical projection typically has many more columns than rows. The number of columns in a panoramic image may exceed the number of rows by a factor of 4 to 5 or more. A projected image representing a view of the scene represented by the panoramic image depends on a certain subset of the rows and columns in the panoramic image. This subset may include, for example, one half to all the rows and $\frac{1}{10}$ to $\frac{1}{4}$ of the columns. In this case, the conventional row-ordered storage of image data leads to very inefficient memory reference patterns when computing the projected image, where the projected image depends on a small part of each row.

The memory reference patterns needed to compute a projected image can be made more efficient by storing the panoramic image in column order instead of row order. In this case, the same data representative of the panoramic image is stored as a sequence of nCol contiguous blocks each containing the data for nRow contiguous pixels. Each such block contains the data for one column of the panoramic image, and the blocks representative of successive columns are stored in sequence of increasing azimuth. In this case, the "width" of the image data (the number of elements per block) becomes a measure of the vertical size of the image, and the "height" (number of data blocks) becomes a measure of the horizontal size of the panoramic image.

The storage of a panoramic image in column order also benefits the calculation of the projected image in column order even though the projected image itself is stored in row order. In this case, the elements of the larger data structure (the panoramic image) are accessed sequentially, and certain operations such as trigonometric functions of the azimuth need be calculated only once per column. The cylindrical environment map of the present invention as set forth below is described in column order wherein the width of the image is a measure of the vertical size of the image, and the height of the image is a measure of the horizontal size of the image.

Given a partial or complete cylindrical environment map, it is possible to generate images of the corresponding three dimensional scene by projecting elements of the cylindrical environment map onto a plane parallel to the axis of the cylinder. The portion of the cylindrical environment map projected onto this plane may be characterized by the azimuth angle and elevation z of the center of the projected image, as well as by the horizontal and vertical field of view angles.

Figure 3:
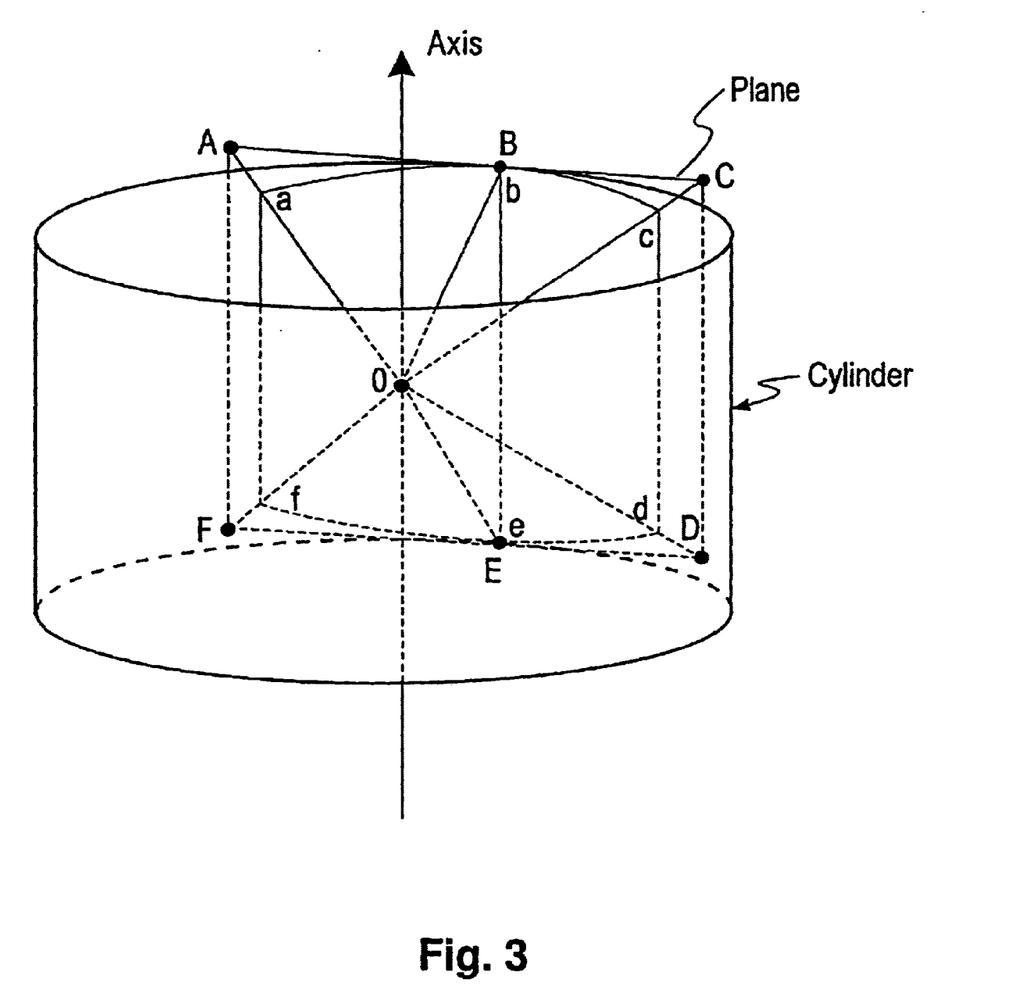
FIG. 3 illustrates the projection of a portion (abcdef) of the cylinder of FIG. 2 onto a plane (ABCDEF) parallel to the axis of the cylinder.

The projection of a portion of a cylinder onto a plane (or the reverse) is illustrated in FIG. 3. Points A, C, D, and F represent the corners of a planar rectangle parallel to the axis of the cylinder. Point B is the midpoint of edge (AC) and point E is the midpoint of edge (DF). Rectangle (ACDF) is tangent to the cylinder along line (BE=be). Points (a, b, c, d, e, and f) represent points on the cylinder defined by the intersections of straight lines from the origin (o) to points (A, B, C, D, E, and F) on the planar rectangle.

Figure 4:
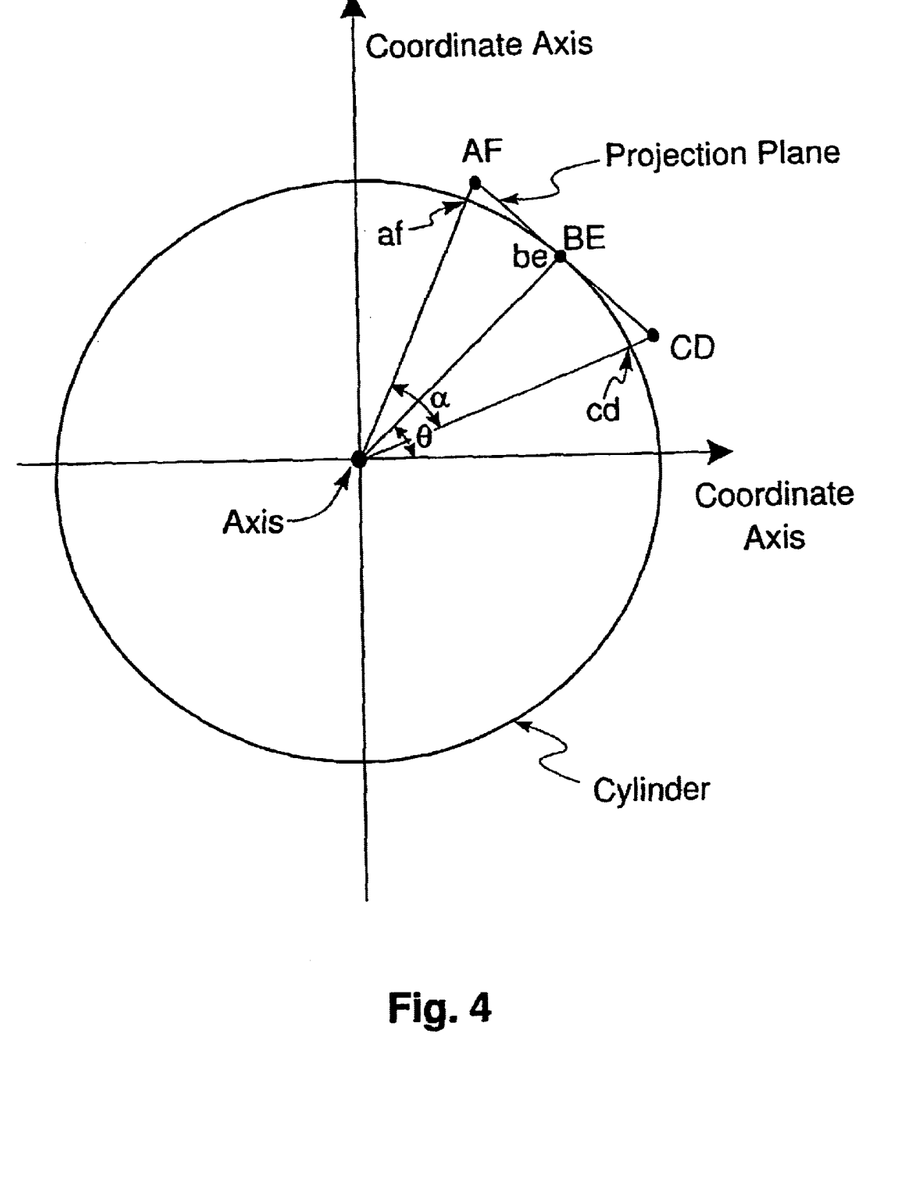
FIG. 4 is a view of the cylinder and projection plane of FIG. 3 as seen looking down the axis of the cylinder.

FIG. 4 shows the same cylinder and plane illustrated in FIG. 3 as viewed looking down the axis of the cylinder. In this view, points A, B, C, a, b, and c coincide with points F, E, D, f, e, and d respectively. The azimuth of line (BE=be) is indicated by the angle. The horizontal field of view angle is determined by the difference between the azimuth of line (af) and the azimuth of line (cd). (Lines (af), (be), and (cd) appear as points in this figure because these lines are all parallel to the axis of the cylinder (and direction of view).

Figure 5:
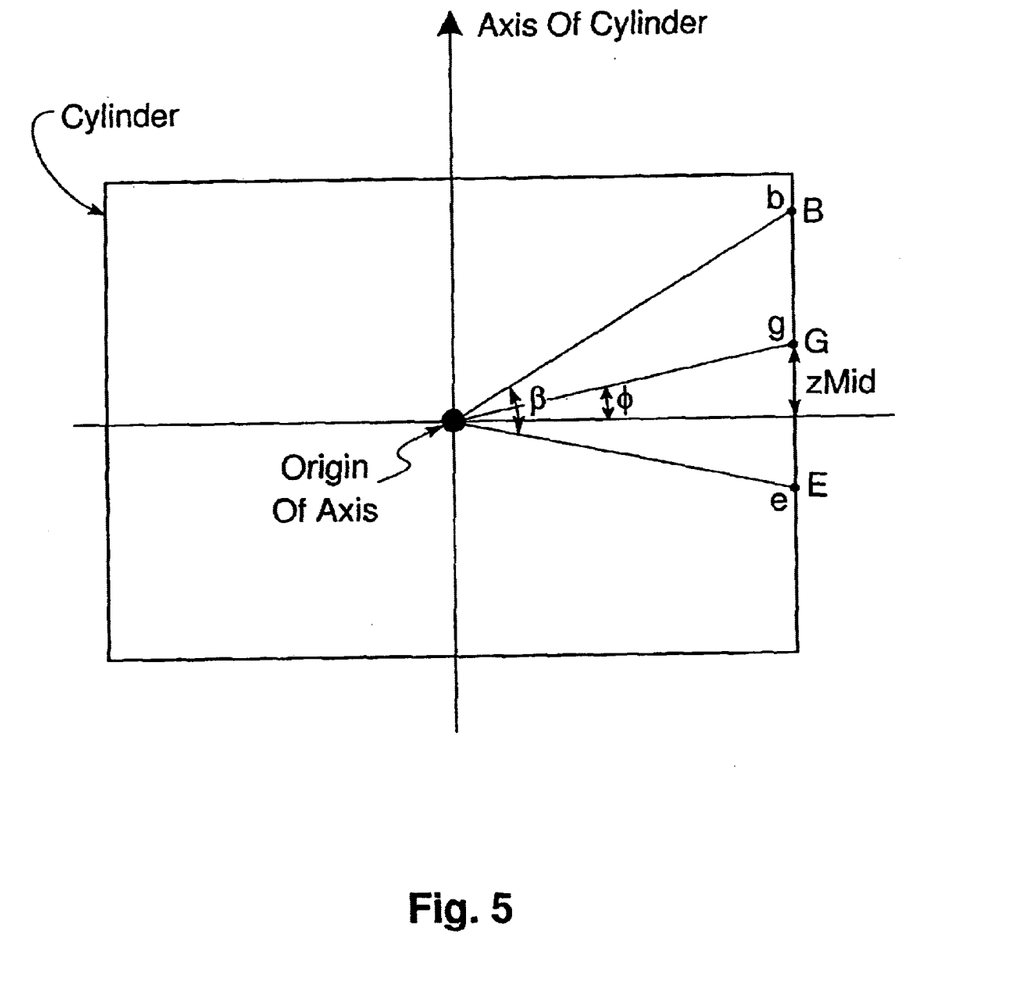
FIG. 5 is a view of the cylinder and projection plane of FIG. 3 as seen from the direction perpendicular to the plane containing the axis of the cylinder and the center line (BE) of the projection plane.

FIG. 5 shows the same cylinder and plane illustrated in FIGS. 3 and 4 as seen from the direction perpendicular to the plane containing the axis of the cylinder and the center line (BE) of the projection plane. The midpoint of center line (BE) is indicated by point G. The elevation angle of point (G) corresponds to an elevation value of zMid.

Start-Up Phase

Referring again to FIGS. 6(A) and (B), in the start-up phase, the target video system loads into memory the background environment map corresponding to the background panoramic image (PRX) captured at the source video system in the calibration phase (step 609). The background environment map may be generated by the target video system upon reciept of the background panoramic image (PRX) from the source video system, or the background environment map may be communicated from the source video system to the target video system. In the alternative, the background environment map may have been stored from a previous conference session, which is appropriate when there is no change in the logistics and lighting conditions of the room since that image was computed, or when there is an intent to not reveal the latest contents of the transmitting room.

In addition, the source video system and the target video system exchange information such that the source and target systems can tailor the images transmitted by the source video system to the target video system in the conference phase (described below) to the capabilities of the source and target systems (step 611). The information exchanged between the source and target preferably includes information about their respective processing capabilities, information regarding the available bandwidth of the communication link between the source video system and target video system, information about the resolution of the display device of the target system, and information regarding the desired sampling rate of the camera.

Conference Phase

Source Video System

In the conference phase, as is conventional, the camera of the source system is manipulated to capture the contribution of the speaker in the room at the source video (step 613). Periodically, the source video is controlled to perform a sampling operation. In the sampling operation, the image IX captured by the source video is stored and the background environment map is rendered according to the current camera position and field of view (step 615). The rendering operation generates an image PRR that is a representation of the background panoramic image (PRX) that is visible for the current camera position and field of view. In addition, the source video system generates a difference image DX that represents the difference between the image IX and the image PRR (step 617). The spatial resolution of the difference image DX may be computed on a pixel per pixel basis (if permitted by the sampling frequency), or on a block by block basis (if a courser difference must be computed due to the sampling frequency). The difference between the image IX and the image PRR is expected to be small (and therefore highly compressible) since most elements in the room will have not changed since the camera environment panorama was computed. Preferably, the source video system uses an encoding algorithm then encodes the difference image, DX, to thereby generate an encoded difference image EX (step 619). The encoding algorithm may be an existing technology such as run length coding, JPEG, px64, or wavelets. Alternatively, the encoding algorithm may compare the current difference image, DX', with an earlier difference image DX, and encode the difference (DX-DX') as is done with frames in existing MPEG algorithms. The encoded difference image, EX, is then communicated to the target video system (step 621). In addition, any changes in camera parameters (such as the azimuth, elevation, zoom ration and position) are communicated to the target video system.

In order to avoid oversampling, the source and target systems may mutually agree to a particular sample rate. In addition, the target system may have the ability to choose its sample rate independently of the other target systems in a particular video conference session.

The rate of sampling at the video source is dependent on:

1) camera capture ability;
2) rate of camera movement;
3) the bandwidth of the communication link; and
4) the computing power of the video source.

The sampling rate cannot be greater than the camera's intrinsic capture rate. With some cameras it is possible to increase the frames per second at the cost of a smaller frame size. This image is then scaled up and used as a regular frame. For example some cameras capture 5 frames per second at a resolution of 640×480 and capture 20 frames per second at a resolution of 320×240. Generally a frame rate of 10 per second is considered acceptable.

If the camera is motionless, the camera capture ability, bandwidth of the link and the power of the compute resource fully determine the sampling rate. However, if the camera's angular velocity is high, i.e., the camera is being moved rapidly, the amount of new information to be transmitted may increase. In such a case the rate of sampling is slowed down so that the communication link and the computing resource do not get overloaded. A rate of 10 samples per second is acceptable.

The bandwidth available on the communication link and the compression scheme clearly determine the sampling rate assuming that the computing resource is not a bottleneck. Since our compression scheme is efficient we are able to use a high sampling rate in most cases. If the bandwidth is a bottleneck, the spatial resolution of the images sent will be reduced, by say sending every other pixel in both the horizontal and vertical directions.

The computing resource also may determine the sampling rate because it may be servicing several video sessions. In general, the computing resources of a modest CPU such as the Pentium 166 MHz is sufficient to maintain a frame rate of above 15 per second. If the computing resource is busy with other services the image will be computed at a lower spatial resolution and then scaled up. The scaling operation will be done at the source if the bandwidth of the link is not a bottleneck. Otherwise it will be done in the target to minimize data to be transmitted. To facilitate rapid computing of image differences and their compression, background panoramic images for more than one resolution will be kept.

In our system, the above factors are considered and the correct sampling rate is employed. The net result is that the frame rate is not allowed to become very small and be displeasing to the eye.

Target Video System

In the conference phase, the target video system receives from.the source video system the encoded difference image EX along with the associated camera parameters (step 623). The target system then decodes the encoded difference image EX to thereby generate the appropriate difference signal DX (step 625). In addition, the target system renders the background environment map according to the camera a parameters communicated from the source video system (step 627). The rendering operation generates an image PRR that is a representation of the background panoramic image (PRX) that is visible for the current camera position and field of view. The target system then adds the image PRR with the difference image DX (step 629), and displays the resulting image on the display device at the target video system (step 631).

In summary, the present invention utilizes environment maps to exploit the fact that image conferencing typically occurs in fixed rooms that do not change much during the session. By generating a background environment map at the video source system prior to conferencing, and using the background environment map at the video target system for conferencing, the image data that is communicated between the system is minimized because it focuses on the dynamic component of the communicated image, and thus may be suitable for lower bandwidth communication links.

I claim:

1. A method for communicating image data from a source system to a target system comprising the following steps performed at said source system:

generating a background environment map, said background environment map comprising a mapping of a panoramic image onto pixels of a three dimensional surface, wherein said background environment map is rendered according to varying positions and fields of view of a camera to provide a view of said panoramic image as seen from different orientations and fields of view;

communicating said background environment map to said target system;

capturing a source image from a position and field of view of said camera;

rendering said background environment map according to said position and field of view of said camera to generate a background image visible for said position and field of view of said camera;

generating a difference image representing difference between said source image and said background image; and communicating said difference image and said position and field of view of said camera to said target system.

2. The method of claim 1, wherein said difference image is an encoding representing difference between a current difference and an earlier difference, wherein said current difference represents difference between said source image and said background image and said earlier difference representing difference between an earlier source image and an earlier background image.

3. The method of claim 1, wherein said step of capturing said source image is performed at a sampling rate that is dependent upon at least one of:

camera capture ability at said source system;

rate of camera movement at said source system;

bandwidth of a communication link linking said source system to said target system; and computing power of said source system.

4. The method of claim 1, further comprising the following steps performed at the target system:

receiving said background environment map from said source system;

receiving said difference image and said position and field of view of said camera from said source system;

rendering said background environment map according to said position and field of view of said camera to thereby generate a background image visible for said position and field of view of said camera;

generating a target image for display, wherein said target image is based upon said background image and said difference image.

5. The method of claim 4, wherein said target image is generated by adding said difference image to said background image.

6. The method of claim 5, further comprising the step of decoding said difference image at said target system to thereby generate a decoded difference image, and wherein said target image is generated by adding said decoded difference image to said background image.

7. The method of claim 1, wherein said three dimensional surface comprises a cylinder.

8. The method of claim 1, wherein said three dimensional surface comprises a sphere.

9. The method of claim 1, wherein said three dimensional surface comprises a polyhedron.

10. A source system for communicating image data to a target system, comprising:

means for generating a background environment map, said background environment map comprising a mapping of a panoramic image onto pixels of a three dimensional surface, wherein said background environment map is rendered according to varying positions and fields of view of a camera to provide a view of said panoramic image as seen from different orientations and fields of view;

means for communicating said background environment map to said target system;

means for capturing a source image from a position and field of view of said camera;

means for rendering said background environment map according to said position and field of view of said camera to generate a background image visible for said position and field of view of said camera;

means for generating a difference image representing difference between said source image and said background image; and means for communicating said difference image and said position and field of view of said camera to said target system.

11. The source system of claim 10, wherein said difference image is an encoding representing difference between a current difference and an earlier difference, wherein said current difference represents difference between said source image and said background image and said earlier difference representing difference between an earlier source image and an earlier background image.

12. The source system of claim 10, said source image is captured at a sampling rate that is dependent upon at least one of:

camera capture ability at said source system;

rate of camera movement at said source system;

bandwidth of a communication link linking said source system to said target system; and computing power of said source system.

13. The source system of claim 10, wherein said three dimensional surface comprises a cylinder.

14. The source system of claim 10, wherein said three dimensional surface comprises a sphere.

15. The source system of claim 10, wherein said three dimensional surface comprises a polyhedron.

16. A target system for receiving image data generated by a source system, the target system comprising:

means for receiving a background environment map from said source system, said background environment map comprising a mapping of a panoramic image onto pixels of a three dimensional surface, wherein said background environment map is rendered according to varying positions and fields of view of a camera to provide a view of said panoramic image as seen from different orientations and fields of view;

means for receiving a difference image and a position and field of view of said camera from said source system;

means for rendering said background environment map according to said position and field of view of said camera to thereby generate a background image visible for said position and field of view of said camera; and means for generating a target image for display, wherein said target image is based upon said background image and said difference image.

17. The target system of claim 16, wherein said target image is generated by adding said difference image to said background image.

18. The target system of claim 17, further comprising means for decoding said difference image at said target system to thereby generate a decoded difference image, and wherein said target image is generated by adding said decoded difference image to said background image.

19. The target system of claim 16, wherein said three dimensional surface comprises a cylinder.

20. The target system of claim 16, wherein said three dimensional surface comprises a sphere.

21. The target system of claim 16, wherein said three dimensional surface comprises a polyhedron.

* * * * *